(12) United States Patent
De Groot

(10) Patent No.: US 6,494,149 B1
(45) Date of Patent: Dec. 17, 2002

(54) LOADING PALLET ASSEMBLY

(76) Inventor: Klaas Willem De Groot, Multatulistraat 1, NL-3221 TP Hellevoetsluis (NL)

( * ) Notice: Subject to any disclaimer, the term of this patent is extended or adjusted under 35 U.S.C. 154(b) by 0 days.

(21) Appl. No.: 09/254,109

(22) PCT Filed: Aug. 26, 1997

(86) PCT No.: PCT/NL97/00483
§ 371 (c)(1),
(2), (4) Date: May 2, 2000

(87) PCT Pub. No.: WO98/08743
PCT Pub. Date: Mar. 5, 1998

(30) Foreign Application Priority Data

Aug. 26, 1996 (NL) .............................................. 1003882

(51) Int. Cl.⁷ ........................... B65D 19/40; B65D 19/06
(52) U.S. Cl. ............... 108/56.3; 108/57.33; 248/346.02
(58) Field of Search ........................ 248/346.02, 346.01, 248/678, 217.2, 218.1, 218.2, 218.3; 108/51.11, 57.14, 57.12, 56.1, 56.3, 57.33

(56) References Cited

U.S. PATENT DOCUMENTS

| | | | |
|---|---|---|---|
| 2,565,292 A | * 8/1951 | Arthur | 105/375 |
| 2,605,070 A | * 7/1952 | Fletcher | 108/57.14 |
| 3,641,948 A | 2/1972 | Brown | 108/56.3 |
| 3,835,791 A | 9/1974 | Brown | 108/56.1 |
| 3,858,526 A | * 1/1975 | Lombard et al. | 206/386 |
| 3,921,279 A | * 11/1975 | Daley | 29/458 |
| 4,915,033 A | * 4/1990 | Bond | 108/55.1 |
| 4,977,836 A | * 12/1990 | Bond | 108/55.1 |
| 5,695,823 A | * 12/1997 | Hsu et al. | 427/370 |

FOREIGN PATENT DOCUMENTS

| | | |
|---|---|---|
| DE | 87 02 655.4 | 8/1987 |
| JP | 01226552 A * | 9/1989 |
| NL | 6 613 140 | 3/1967 |
| NL | 9 101 725 | 5/1993 |

* cited by examiner

Primary Examiner—Ramon O. Ramirez
Assistant Examiner—Jon Szumny
(74) Attorney, Agent, or Firm—Crowell & Moring LLP

(57) ABSTRACT

A construction, such as a pallet, provided inter alia with plate-like components of nailable material, for instance of wood and/or wood fibers, plastic and the like which are pressed together with glue under pressure and/or with addition of heat, wherein at least two plate-like elements, each of random thickness, are joined together on the mutually facing surfaces using one or more, whether or not spatial nail elements, in order to increase the carrying capacity of the pallet construction. If desired the space between the deck plates can be filled with a material of a low specific gravity, like foam.

18 Claims, 3 Drawing Sheets

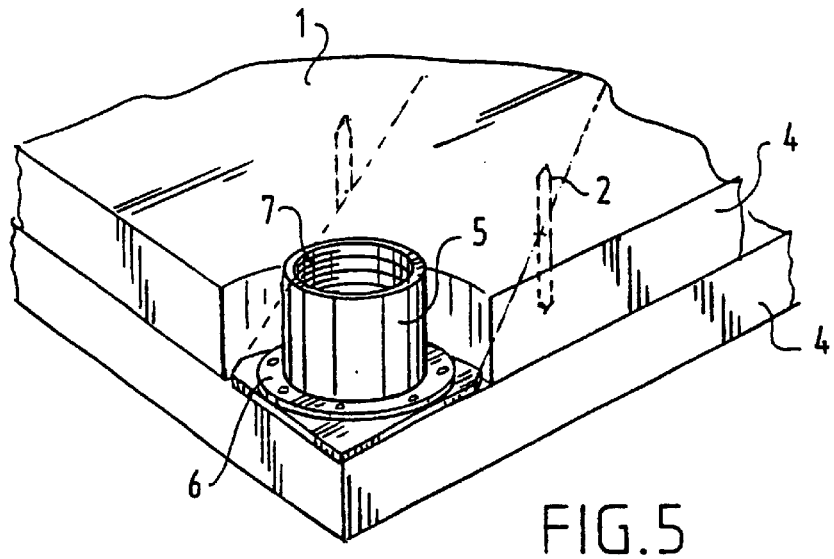
FIG.5
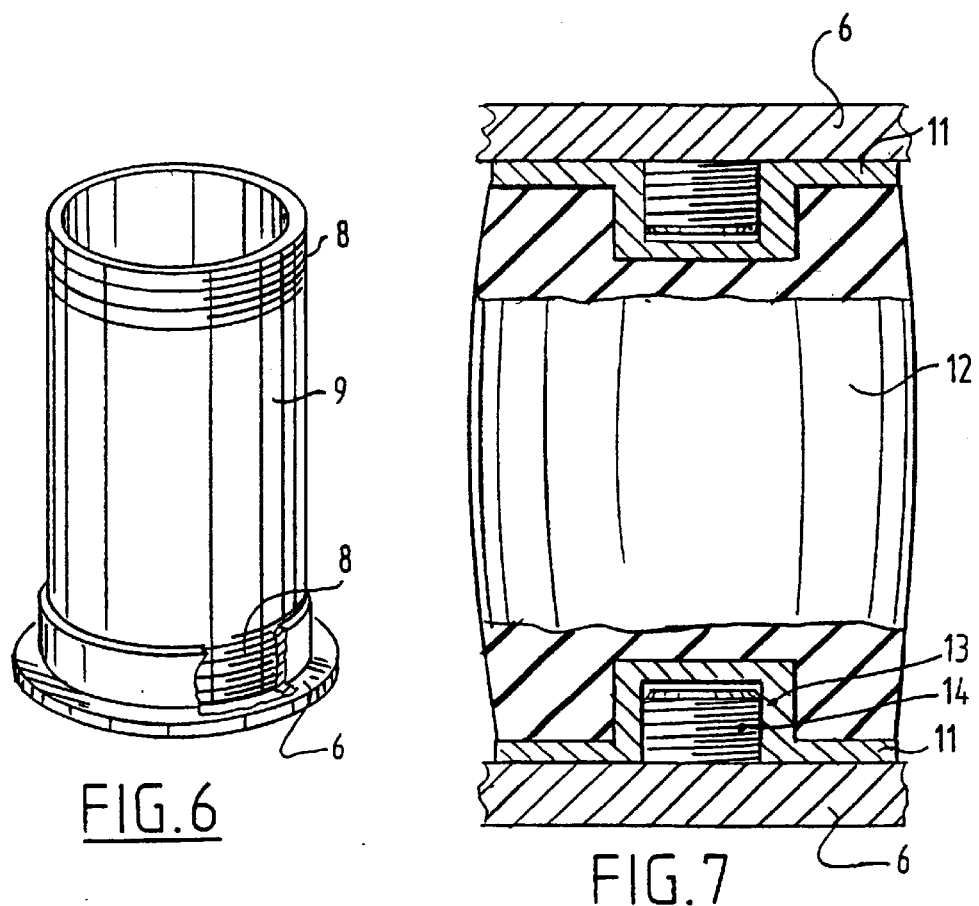
FIG.6
FIG.7

LOADING PALLET ASSEMBLY

BACKGROUND OF THE INVENTION

The invention relates to a construction, such as a pallet, provided with plate-like components of nailable material, for instance of wood chips, wood parts and/or wood fibers, plastic and the like which are pressed together with glue under pressure and/or with addition of heat to form such a plate-like component. At least two of said plate-like components, each of random thickness, are joined together on mutually facing surfaces using one or more nail elements to form a plate-like element. The nail element is embodied as a spatial body provided with nail-like fixing elements for connection to the surfaces of the upper and lower plate-like components.

Due to its composition and method of production, the plate material has a sufficiently high modulus of elasticity and sufficient capacity to withstand shear, pressure and tensile stresses and distribute them while being loaded for instance perpendicularly to the surface of the plate-like element.

Such a construction is disclosed in DE-U-8702655.4.

SUMMARY OF THE INVENTION

An object of the invention is to further improve the carrying capacity of such a construction and provides a construction which is distinguished in that the spatial body is formed as a framework from a flat wire mat which is folded along predetermined lines A, B, C parallel to the surfaces.

Since the nail element is a spatial body which is arranged between the upper and lower plate-like components of the construction, a good resistance against shearing of the assembly is achieved.

According to a main feature of the invention, a wire mat can be folded along predetermined lines to form the spatial construction. The nail-like fixing elements can be fixed to the spatial body in random manner but in case of a wire mat the invention further proposes cutting through predetermined wires of the flat mat. The cut parts are arranged to protrude outside of the spatial body after a folding of the mat, thus forming the nails of the fixing elements.

For some applications it is advantageous to fill the assembly with a foam material in a space formed between the upper and lower plates which embed the spatial body.

In order to optimize resistance against the nails being pulled out of the nailable material, the ends of the nails are given a chamfering, such that, during a pressing in, they preferably assume a so-called open-tulip position in the nailable material.

The invention further provides incorporating a nail element known from the Netherlands patent application number 9101725 on the joint face of the two nailable components, both having equal thicknesses to form a plate-like component being able to withstand a load perpendicularly to the surface which is four times the load which a component used singly can withstand.

In order to enable a still better absorption of pressure load, the plate-like body of a nail element can have a minimum of one reinforcing rib rolled-therein. The form of the rib can be a milled recess for a good fit in the nailable component.

In the case of nailable elements joined together from a minimum of three parts with nail elements, a nail element can also be arranged adjacent the lower element being the tensile zone of the plate-like component.

It is also possible to fix a nail element both in the assembly of at least three nailable elements on the joint face in the middle of the constituent parts and in the tensile zone of the assembly. Withstanding of a compression and a tensile stress can hereby be optimized.

As a result of the two described nailable components, when joined together the components are capable of withstanding a minimum of four times a pressure load, it is also possible to reduce the thickness dimension of the nailable plate material to a thickness sufficient to withstand a load suitable for a single nailable element. On the other hand, due to the ability to withstand a higher load, the option is present of allowing a heavier load on an identical surface.

A practical use of the assembly of the present invention is for the deck of a loading platform (pallet). In current practice standard pallets are usually constructed from wooden parts having a small width wherein the so-called top deck is first fixed to a so-called intermediate deck. This assembled pallet deck is then fixed with nails to wooden or plastic spacers. The number of spacers amounts to nine in order to make the pallet construction sufficiently rigid and stable. These spacers are placed such that each side of the rectangular form contains three spacers with one placed in the center of the pallet construction. At a prescribed length, the spacers leave space allowing access for forks of (internal) transport material such as fork-lift trucks from the ground or a substructure of the pallet. This known pallet construction having nine spacers allows fork access on each rectangular side and is called a four-way pallet. Pallet constructions are also known which have both a top deck and a bottom deck, so-called double-decker pallets. The spacers are then arranged between the intermediate decks.

The pallet construction according to the invention allows the nail element to join together the joint face of two nailable components of, for instance, rectangularly shaped plate material, along the diagonals of the rectangle. The nail elements, which may or may not be provided with reinforcing ribs, allow the utilization of a metal bush, which is pre-fixed to the nail element and has an internal screw thread to enable, for instance, a cylindrically formed spacer to be screwed on.

Since the joined together nailable components have such a great capacity to withstand pressure load, it is possible to fix only five spacers to the pallet deck, i.e. one on each of the four corners and one in the center of the pallet construction. This gives fork access to (internal) transport material on eight sides of the pallet, i.e. on the four rectangle sides in addition to the diagonal directions. It is then possible to speak of an eight-way pallet. The advantage of an eight-way access is that it achieves time-saving because, for instance, a pallet truck or fork-lift truck does not have to take an angle of 90° in all cases.

Should still more rigidity be required of the pallet construction, a nail element can then also be pressed on the joint face on each rectangle side.

The pallet construction according to the invention can likewise be provided with a bottom deck. The spacers can be screwed in a simple manner to the bushes by giving them opposing threads.

Because the spacers are screwed onto a bush fixed to the nail element and are provided with a screw thread, it is also possible to couple these to, for instance, a rod of vibration-damping or vibration-absorbing material, consisting, for instance, of rubber and/or plastic. Instead of a rubber/plastic rod, it is also possible to couple to, for instance, a double-action hydraulic cylinder and, although this is not immediately obvious, to a construction with a gas spring. Since coupling to the bottom deck of a pallet is possible in a manner identical to coupling to the top deck of a pallet, the pallet can also be employed upside down while retaining vibration-damping and vibration-absorbing properties. The advantage of a thus constructed pallet is the possibility of, for instance, being able to adjust the rupture value of carton constructions which permit a lighter gram weight per unit. Since the construction of the spacer likewise has a good capacity to withstand shocks, also in horizontal direction, which may occur during use in a transport path, it will be possible to reduce the consequences of subsequent damage.

The invention will be further elucidated in the figure description hereinbelow of a number of embodiments.

BRIEF DESCRIPTION OF THE DRAWINGS

FIG. 5 is a perspective view of the upper part of a bottom deck of a loading platform (pallet) with a metal bush of cylindrical form fixed by spot welding to the nail element and provided with an internal screw thread for screwing in the spacer, FIG. 6 is a perspective view of a metal, cylindrically formed spacer with external screw thread on both sides such that one side fits into the bush of FIG. 5 and the other side can be utilized for screwing on a flange of larger diameter to enable increased stability of the pallet, FIG. 7 shows a section through a spacer which has between metal plates with threaded connection a rod of rubber vulcanized thereon. Said metal plates are fixed to coupling pieces provided with screw thread which are suitable for screwing on the bush of FIG. 5.

DETAILED DESCRIPTION OF THE PREFERRED EMBODIMENTS

Figure 2:
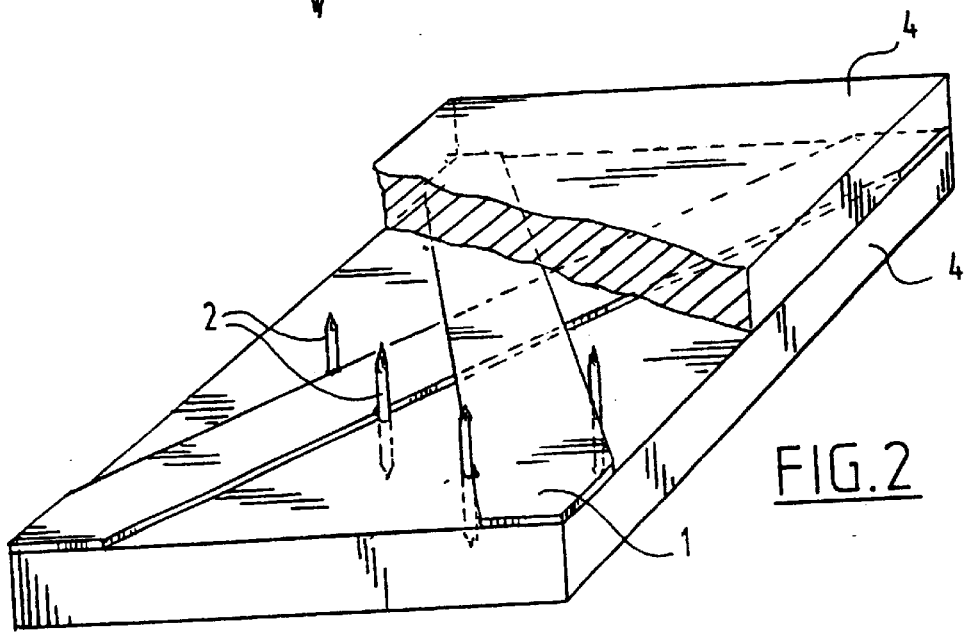
FIG. 2 shows a perspective view of an embodiment of a loading platform provided with nail elements extending diagonally on the joint face between two nailable plate-like elements which are joined together under pressure to form a loading platform deck.

Designated with the numeral 1 in the figures is the nail element which consists of a plate-like body with elongate members 2 fixed thereto, as described in the earlier Netherlands patent application 9101725. Such a plate-like body is arranged between two plates of nailable material, as shown in FIG. 2. These plates 4 are placed under pressure on nail-like elements 2 so that a firm attachment is effected between the lower and upper plates.

Figure 1:
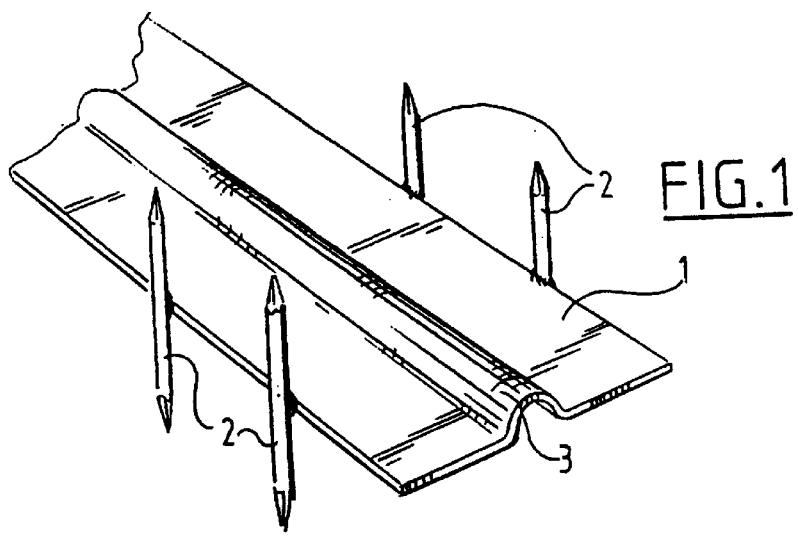
FIG. 1 shows a perspective view of a nail element wherein the plate-like body has had a reinforcing rib rolled therein.

In order to increase the bending stiffness, the plate-like body 1 in FIG. 1 is embodied with a reinforcing rib 3. When the upper and lower plates are of particular materials, this reinforcing rib 3 can be pressed therein but the rib can also serve as spacer between both plates, whereafter this space may or may not be filled with a foam material.

FIG. 2 shows in particular that the nail-like element 1 runs at a diagonal to the rectangular upper and lower plates 4. A second nail-like element is arranged along the other diagonal.

Figure 3:
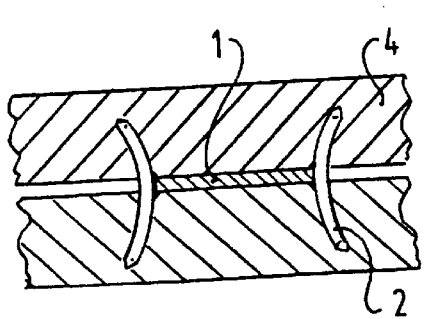
FIG. 3 shows a cross-section of a nail element pressed between nailable material with attached elongate members which display a so-called open-tulip position.

By not giving the nail-like members 2 a tip but cutting them off in a straight plane which runs obliquely to a lengthwise axis of the nail-like member, a force can be exerted on the nail-like member 2 during pressing such that it will begin to bend, (see FIG. 3), wherein a so-called open-tulip position is realized. This increases the pull-apart strength of the plates 4.

Figure 4:
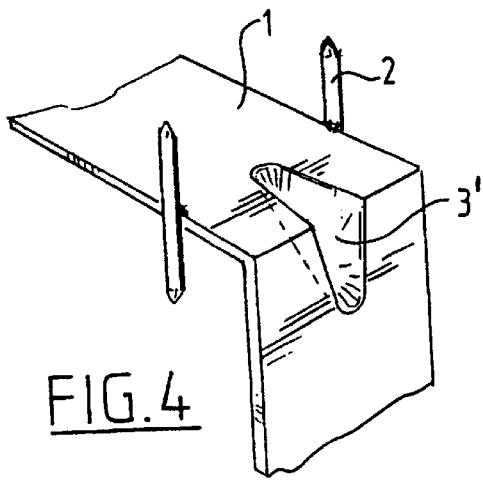
FIG. 4 shows a perspective view of a corner reinforcement in a plate-like body of a nail element bent through 90°.

FIG. 4 shows a detail of a nail-like element 1 which is bent through an angle whereby the bent portion can protrude outside plates 4 and can serve for fixing of other elements, for instance spacers, if the construction is used for a loading platform, for instance a pallet. The corner reinforcement takes place with a rib 3 which can be obtained by cold deformation.

FIG. 5 shows an alternative for arranging elements for the mounting of spacing pieces. For this purpose the corner of upper plate 4 is removed whereby the corner of the plate 1 of the nail element is exposed. If this plate is of weldable material, a bush 5 can be arranged which is provided with a flange 6 which can be attached to plate 1 by means of spot welds. The bush can be provided with an inner thread 7, into which spacers 9 provided with an outer screw thread can be screwed. These spacers 9 can be of random type.

FIG. 6 shows a possible embodiment wherein the spacer 9 is provided on both ends with an outer screw thread 8 which co-acts with inner screw thread 7 of bush 5. By giving the screw thread 8 an opposing pitch at the top and bottom, the spacer can, for instance, mutually connect two pallet decks by screwing them simultaneously into bushes 5, wherein a so-called double pallet is created. The spaces between upper and lower decks serve to receive the forks of a fork-lift truck, this being generally known.

FIG. 7 shows a damping spacer corresponding with that of FIG. 6, incorporating a shock-absorbing material, for instance rubber. The rubber body 12 is provided on either end with a vulcanized flange 11 which is provided centrally with a recessed threaded bush 13. This recessed threaded bush 13 co-acts with a threaded stub 14 which is fixed to a flange 6 which can be attached in the manner shown in FIG. 5 to nail-like element 1. With such shock-absorbing spacers 12, a pallet can be manufactured which can carry shock sensitive freight.

Figure 8:
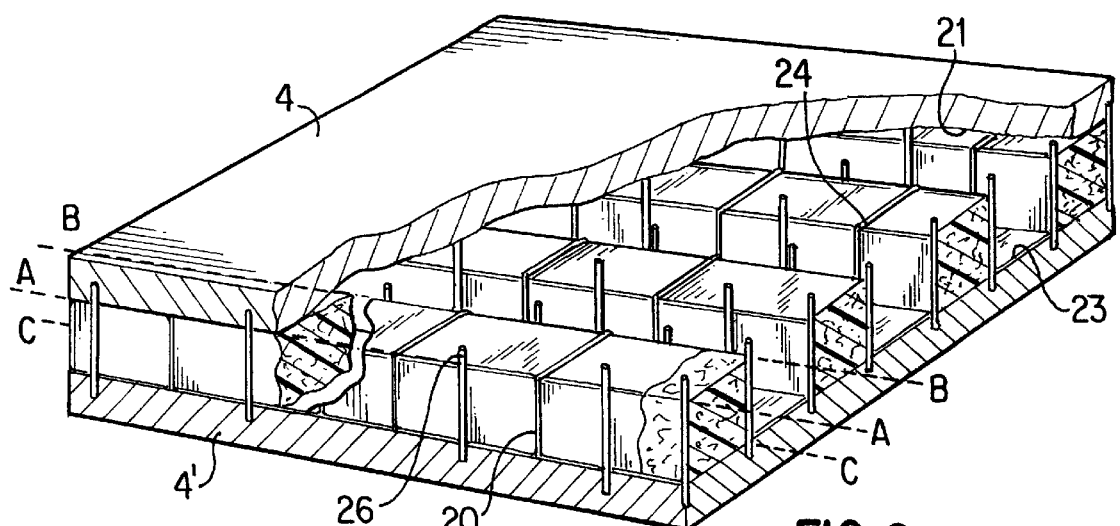
FIG. 8 is a perspective view of a loading platform (pallet) provided with an upper and a lower plate which are held spaced apart by a spatial body provided with nail-like fixing means.
Figure 9:
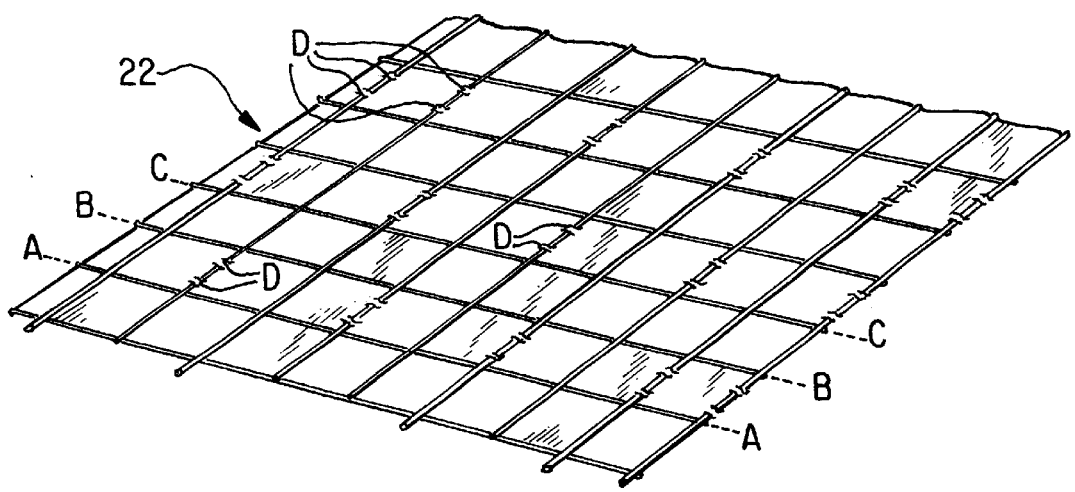
FIG. 9 shows a wire mat for manufacturing a spatial body of FIG. 8.

FIG. 8 shows an embodiment wherein the upper and lower decks 4, 4' are held apart by a nail element embodied as a spatial body 20. The starting point is a wire mat 22 lying in a plane parallel to the facing opposed surfaces 21, 23 of the upper and lower decks 4, 4' as shown in FIGS. 8 and 9 which is bent in zigzag form along the lines A, B and C. This results in a crenellated construction which can be mounted in suitable manner on the nailable upper and lower decks 4, 4'. The crenellated construction results in inverted U-shaped support portions 24 extending upwardly and U-shaped support portions 25 extending downwardly, and a plurality of parallel wire portions 27 connected to each other by the U-shaped support portions 24 and 25.

Figure 10:
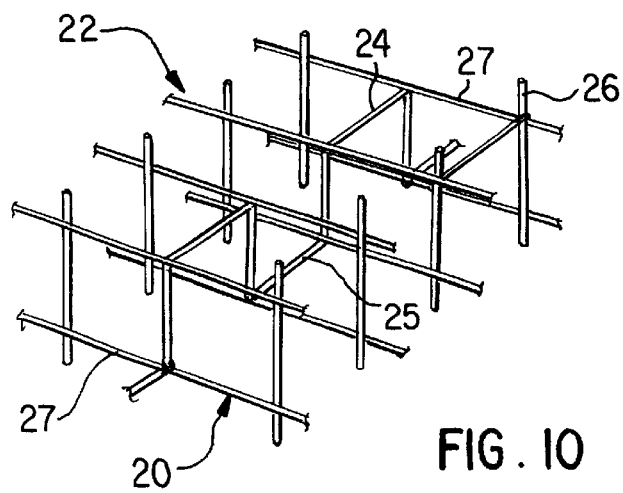
FIG. 10 shows a detail of the forming of the nail-like fixing means in a wire mat according to FIG. 9.

A possible embodiment is to cut through the wires of mat 22 at suitable positions at D, whereby after folding along the lines the released portions will point upward to form nail elements 26, as shown in FIG. 10. These portions function as fixing means by presssing them in the manner shown in FIG. 3 into the upper and lower plate 4, 4'.

FIG. 8 also shows that the space between the lines A and B can be filled by a foam material. The spaces left clear can serve to receive the forks of a fork-lift truck.

If desired, the whole space can be filled with foam material of random nature, whereby an assembly results which can serve per se as an upper deck for a pallet. This must then be provided with spacer pieces as shown in FIG. 6 to create space for the forks of a fork-lift truck.

The invention is not limited to the above described embodiments. The nail-like element 1 of FIG. 1 may also be provided with more plates at a distance one above another. The connections between the plates are provided by the elongate elements 2. The optional upper and lower plates 4, 4' are thereby also separated from each other at a greater distance than shown in FIG. 3, whereafter the space therebetween can, if desired, be filled with a foam material according to FIG. 8.

Instead of foam material, other reinforcing steps can be applied, such as shores or profiles which are incorporated into the wire mat.

It will be apparent that by using appropriate materials for plates 4, nail-like elements 1, and spacers 9, 12, diverse assemblies, in particular loading platforms, can be manufactured which are specifically suitable for a particular type of load that has to be transported.

The spacers 9 of FIG. 6 can also be provided with casters, whereby the pallet can be transported on its own wheels. This enables use of the pallet in automated freight handling by means of known conveying means. The spacers can, moreover, also serve as coupling pieces for adjoining loading platforms, whereby the loading platforms can be arranged as a train.

What is claimed is:

1. A pallet assembly comprising:
   a first and a second plate each comprising a surface, said first and second plates being spaced apart with the surface of the first plate being opposed to the surface of the second plate;
   a nail element arranged between the first and second plates and comprising fixing elements pressed into the surfaces of the first and second plates;
   wherein the nail element comprises a wire unit in the form of a crenellated framework disposed between the first and second plates and including a plurality of bends which form alternating upwardly and downwardly opening U-shaped support portions that extend between and separate said first and second plates;
   and a plurality of parallel wire portions; wherein the U-shaped support portions connect the parallel wire portions to each other.

2. The assembly according to claim 1, wherein the fixing elements are formed by portions of the wire unit being cut prior to formation of the bends.

3. The assembly according to claim 2, wherein a space formed by the framework between the first and second plates is filled with a filler.

4. The assembly according to claim 3, wherein the filler is a foam plastic.

5. The assembly according to claim 2, wherein the first and second plates are made from a member selected from the group consisting of wood chips, wood parts, wood fibers and plastic.

6. The assembly according to claim 5, wherein each of the first and second plates is pressed together under pressure or with the addition of heat.

7. The assembly according to claim 6, wherein each of the first and second plates is pressed together under pressure and with the addition of heat.

8. The assembly according to claim 1, wherein the fixing elements are formed by portions of the wire unit being cut and bent to extend toward the first and second plates.

9. The assembly according to claim 8, wherein a space formed by the framework between the first and second plates is filled with a filler.

10. The assembly according to claim 9, wherein the filler is a foam plastic.

11. The assembly according to claim 8, wherein the first and second plates are made from a member selected from the group consisting of wood chips, wood parts, wood fibers and plastic.

12. The assembly according to claim 11, wherein each of the first and second plates is pressed together under pressure or with the addition of heat.

13. The assembly according to claim 12, wherein each of the first and second plates is pressed together under pressure and with the addition of heat.

14. The assembly according to claim 1, wherein a space formed by the framework between the first and second plates is filled with a filler.

15. The assembly according to claim 14, wherein the filler is a foam plastic.

16. The assembly according to claim 1, wherein the first and second plates are made from a member selected from the group consisting of wood chips, wood parts, wood fibers and plastic.

17. The assembly according to claim 16, wherein each of the first and second plates is pressed together under pressure or with the addition of heat.

18. The assembly according to claim 17, wherein each of the first and second plates is pressed together under pressure and with the addition of heat.

* * * * *